United States Patent
Aoki et al.

(10) Patent No.: US 6,954,317 B2
(45) Date of Patent: Oct. 11, 2005

(54) MAGNETIC TRANSFER METHOD AND APPARATUS

(75) Inventors: Masashi Aoki, Kanagawa-ken (JP); Kazunori Komatsu, Kanagawa-ken (JP); Masakazu Nishikawa, Kanagawa-ken (JP); Junichi Nakamikawa, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 595 days.

(21) Appl. No.: 10/059,259

(22) Filed: Jan. 31, 2002

(65) Prior Publication Data

US 2002/0159177 A1 Oct. 31, 2002

(30) Foreign Application Priority Data

| Feb. 1, 2001 | (JP) | 2001/025675 |
| Feb. 23, 2001 | (JP) | 2001/047813 |
| Nov. 26, 2001 | (JP) | 2001/359368 |

(51) Int. Cl.[7] ............................. G11B 5/86; G11B 5/84
(52) U.S. Cl. ........................................ 360/17; 360/15
(58) Field of Search ..................................... 360/15–17

(56) References Cited

U.S. PATENT DOCUMENTS 5,991,104 A * 11/1999 Bonyhard .................. 360/15
6,347,016 B1 * 2/2002 Ishida et al. ............... 360/17
6,611,388 B1 * 8/2003 Miyata et al. .............. 360/17

FOREIGN PATENT DOCUMENTS

| EP | 0 915 456 A1 | 5/1999 |
| JP | 63-183623 | 7/1988 |
| JP | 10-40554 | 2/1998 |
| JP | 10-269566 | 10/1998 |

* cited by examiner

Primary Examiner—Sinh Tran
Assistant Examiner—Dan I Davidson
(74) Attorney, Agent, or Firm—Sughrue Mion, PLLC

(57) ABSTRACT

When a master medium and a slave medium are brought into close contact and a transfer magnetic field is applied thereto to perform magnetic transfer, the leakage magnetic field intensity of the transfer magnetic field is regulated to within a permissible range, making possible the transfer of an exact magnetic pattern. After a magnetic field is applied to the slave face in the track direction thereof to initially magnetize the slave medium in the track direction, the master medium and the slave medium are brought into close contact. When applying a transfer magnetic field in the track direction of the slave face to perform a magnetic transfer, the magnetic field intensity component in the direction opposite that in which the transfer magnetic field is to be applied is regulated to less than or equal to ½ the magnetic coercive force Hcs of the slave medium over the entire slave surface.

12 Claims, 9 Drawing Sheets

F I G . 2
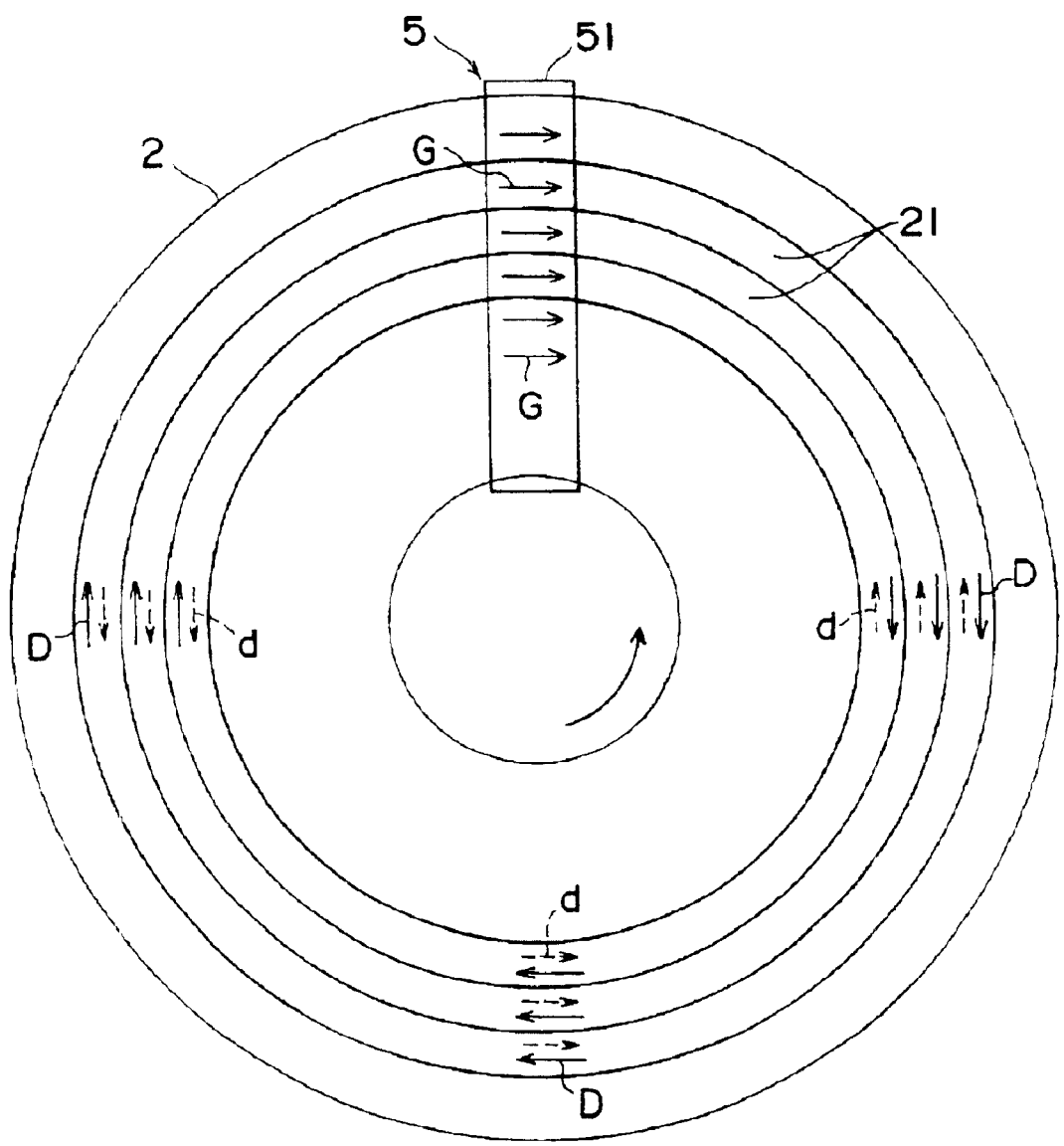

F I G. 4A
F I G. 4B
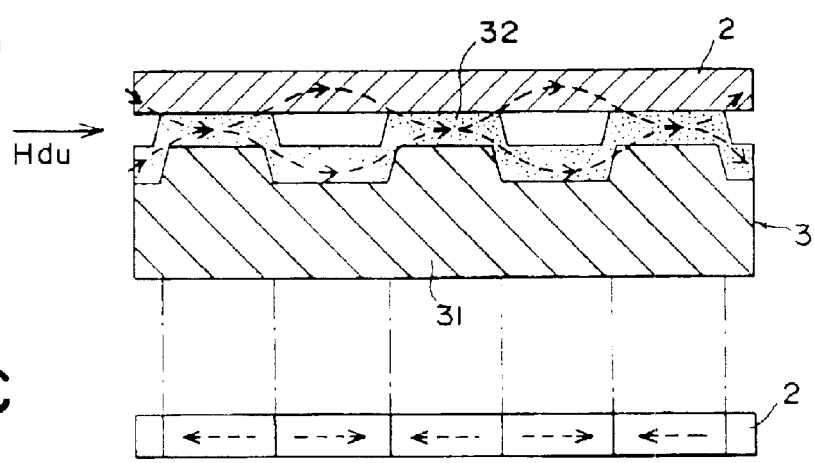
F I G. 4C

MAGNETIC TRANSFER METHOD AND APPARATUS

BACKGROUND OF THE INVENTION

1. Field of the Invention

The present invention relates to a magnetic transfer method and apparatus for magnetically transferring data borne on a master medium to a slave medium.

2. Description of the Related Art

Generally speaking, with regard to magnetic storage mediums, there is a demand for increased storage capacity and low cost. Further desired are so-called high-speed access mediums, which are capable of advantageously reading out the data of a desired location in a short time. Examples of these mediums include hard disks and HD (high-density) flexible disks; so-called tracking servo technology, wherein the magnetic head accurately scans a narrow width track to achieve a high S/N ratio, plays a substantial role in attaining the high storage capacity thereof. A servo signal, address data signal, replay clock signal, etc., used for tracking within a certain interval occurring in one rotation of the disk are "preformatted", that is, recorded on the disk in advance.

The magnetic head is set so as to be capable of reading out the preformatted signals and correcting its position thereby, whereby the magnetic head can accurately scan the track. According to the currently available preformatting technologies, one disk at a time, one track at a time is recorded by use of a specialized servo recording apparatus.

However, because the servo recording apparatuses are expensive and the preformatting operation consumes a considerable amount of time, this process accounts for a significant portion of the manufacturing costs incurred in producing preformatted disks; a reduction of said costs is desirable.

Meanwhile, methods of utilizing magnetic transfer to achieve this objective, not writing one preformatting track at a time, have been proposed.

According to magnetic transfer technologies, a master medium and a slave medium are brought into close contact, and while maintained in this state of close contact, a transfer magnetic field is applied thereto, whereby a magnetic pattern corresponding to the data (e.g., a servo signal) borne on the master medium is transferred to the slave medium. Magnetic transfer methods have been proposed in, for example, Japanese Unexamined Patent Publication Nos. 63(1988)-183623, 10(1998)-40544, and 10(1998)-269566. According to the magnetic transfer occurring in these methods: a master medium having an uneven pattern corresponding to the data to be transferred to the slave medium, which is a magnetic transfer receiving medium such as a magnetic disk or the like, is prepared; this master medium is brought into a state of close contact with the slave medium; then, because by applying a transfer magnetic field, the magnetic pattern corresponding to the data carried by the uneven pattern (e.g., a servo signal) of the master medium is transferred to the slave medium, the preformatting can be performed without changing the relative positions of the master medium and the slave medium—that is, while the two media remain stationary; and not only is it possible to perform an accurate recording of the preformat data, it becomes possible to do so in an extremely short time.

Note that the transfer magnetic field is applied to a conjoined body formed of a slave medium and a master medium(s) brought into close contact with one surface or both surfaces of the slave medium, by use of a magnetic field generating means employing an electromagnetic or permanent magnet apparatus (es), which is disposed on one or both sides of the conjoined body. When the transfer magnetic field is applied, the conjoined body, formed of the master medium(s) and the slave medium that have been brought into and maintained in close contact, or the magnetic field is rotated relative to each other, whereby a magnetic pattern is transferred to the track on the circumference of the disk shaped slave medium(s).

However, according to the magnetic transfer method described above, in order to improve the degree of accuracy with which the magnetic pattern corresponding to the transfer data borne on the uneven pattern formed on the data bearing surface of the master medium is transferred and recorded onto the recording surface of the slave medium, it is necessary that the transfer magnetic field be applied be applied in the track direction while the data bearing face of the master medium and the slave surface of the slave medium are maintained in a close-contact state.

However, in actuality, it is difficult to generate the magnetic field to be applied by the magnetic field generating means so that it is parallel with the track direction over the entirety of the area encompassing the inner to the outer circumference of the slave surface of the slave medium; a portion of the magnetic field generated leaks into the surrounding vicinity. If the intensity of the portion of the transfer magnetic field that is leaked is high, the correct magnetic pattern to be transferred to and recorded on the slave medium becomes distorted, whereby an accurate transfer cannot be performed; for cases in which the transfer data is a servo signal, a problem arises in that an adequate tracking function cannot be obtained, and the reliability is thereby reduced.

In particular, for cases in which the magnetic pattern has been recorded on a single slave medium, unless a magnetic field of the intensity of the magnetic coercive force Hcs of the slave medium is used, the magnetic pattern will not become distorted; however, it has been clearly determined that when the slave surface of the slave medium is brought into contact with the data bearing surface of the master medium, which has the uneven pattern, the magnetic field is concentrated by the uneven pattern, so that a magnetic field having approximately ½ of the magnetic coercive force Hcs distorts the magnetic pattern.

SUMMARY OF THE INVENTION

The present invention has been developed in view of the foregoing problems, and it is a primary object of the present invention to provide a magnetic transfer method and apparatus capable of accurately transferring an exact magnetic pattern, when the data bearing surface of a master medium and the recording surface of a slave medium are brought into close contact and a transfer magnetic field is applied thereto to perform a magnetic transfer, by regulating the permissive range of the leakage magnetic field operative in the direction opposite that in which the magnetic field has been applied.

Further, the applicants of the present application have discovered that in order to attain a better quality magnetic transfer when performing a magnetic transfer such as that described above, it is preferable that the slave medium be magnetized initially. A magnetic transfer method and apparatus wherein: after initially magnetizing the slave medium by applying a predetermined direct current magnetic field thereto, the slave medium is brought into close contact with the master medium, and the magnetic transfer is performed by applying the transfer magnetic field in the direction opposite that in which the initial magnetization current has been applied, have been proposed in Japanese Unexamined Patent Publication No. 11(1999)-117800. However, because the process of initially magnetizing the slave medium is required, increases in the costs and time requirements are incurred thereby. Therefore, there is a call for simplifying the manufacturing process and reducing costs.

In view of these circumstances, it is a further object of the present invention to provide a magnetic transfer method and apparatus realizing reduced costs and a simplified manufacturing process.

The magnetic transfer method according to the present invention is a method of bringing into close contact a magnetic transfer master medium, which is formed of a substrate and a magnetic layer formed on the portion of the surface thereof corresponding to the data signal, and a magnetic recording medium, which is a transfer receiving slave medium, and applying a transfer magnetic field to the conjoined body formed by the master medium and the slave medium maintained in the close-contact state, to perform the magnetic transfer; wherein: a magnetic field is applied to the slave surface in the track direction to initially magnetize the slave medium in the track direction; then, the master medium and the initially magnetized slave medium are brought into close contact, forming a conjoined body; a transfer magnetic field is applied to the slave surface in the track direction; and the magnetic field intensity of the transfer magnetic field in the direction opposite that of the track direction and across the entirety of the recording surface region of the slave medium is ½ or less of the magnetic coercive force Hcs of the slave medium, when the magnetic transfer is performed.

It is desirable that the magnetic coercive force Hcm of the magnetic layer of the transfer master medium is 48 kA/m (≈600 Oe) or less.

Further, it is desirable that the slave medium be a disk shaped magnetic recording medium such as a hard disk, a flexible disk or the like.

Note that it is desirable that the initial magnetization direction and the direction in which the transfer magnetic field are applied are substantially opposite to each other. As to the data signal, it is particularly advantageous if a servo signal is employed thereas.

The magnetic transfer apparatus according to the present invention is an apparatus that brings into close contact a magnetic transfer master medium, which is formed of a substrate and a magnetic layer formed on the portion of the surface thereof corresponding to the data signal, and a magnetic recording medium, which is a transfer receiving slave medium, and applies to the conjoined body formed thereby a transfer magnetic field to perform a magnetic transfer; comprising: a magnetic field generating means that applies a transfer magnetic field to the aforementioned conjoined body in the track direction; wherein the magnetic field intensity of the transfer magnetic field generated by said magnetic field generating means is ½ or less of the magnetic coercive force Hcs of the slave medium in the direction opposite that of the track direction across the entirety of the recording surface region of the slave medium.

As to the magnetic field generating means for applying the transfer magnetic field, although an electromagnetic apparatus or a permanent magnetic apparatus can be employed thereas, from the standpoint of the setting and adjustability of the intensity of the magnetic field and other such conditions, it is preferable that an electromagnetic apparatus be employed.

It is desirable that the magnetic coercive force Hcs of the magnetic layer of the transfer master medium is 48 kA/m (≈600 Oe) or less.

It is desirable that the slave medium be a disk shaped magnetic recording medium such as a hard disk, a flexible disk, or the like.

For cases in which the magnetic transfer apparatus is an apparatus for performing the magnetic transfer on a disk shaped magnetic recording medium, the magnetic field generating means is a means that generates a magnetic field in the direction parallel to the track direction within the range extending in the radial direction of the slave medium; wherein it is desirable that the magnetic transfer be performed on the entire surface of the slave medium by relatively rotating the conjoined body and the magnetic field generating means.

It is desirable that the magnetic transfer apparatus according to the present invention be further provided with a initial magnetizing means that initially magnetizes the slave medium in the track direction thereof.

That is to say, according to the magnetic transfer apparatus of the present invention, basically, it is preferable that: first, the initial magnetizing means initially magnetizes the slave medium by applying a direct current magnetic field in the track direction thereof; the slave medium is brought into close contact with the magnetic layer that has been formed over the uneven pattern, which corresponds to the transfer data, of the master medium; and a transfer magnetic field is applied in the direction substantially opposite that in which the initial magnetizing current has been applied to the slave surface, to perform the magnetic transfer. It is preferable that the data signal be servo data.

Note that in performing the magnetic transfer on a slave medium on which both faces thereof have been provided with a magnetic layer, there are cases in which a master medium is brought into close contact with a single surface of slave medium and the magnetic transfer is performed one surface at a time, and cases in which each of two master mediums are brought into close contact with one of the two surfaces of the slave medium, respectively, and the magnetic transfer is performed on both surfaces concurrently. In this case, a master medium(s) is brought into close contact with a single or both of the surfaces of the slave medium, and a magnetic field generating means is disposed on said single side or both sides of the slave medium and the transfer magnetic field is applied thereby.

The initial magnetization of the slave medium consists of generating a magnetic field of a magnetic field intensity distribution having a magnetic field intensity portion of an intensity equal to or greater than that of the magnetic coercive force Hcs of the slave medium, on at least one or more positions of the track direction, by rotating the slave medium or the magnetic field in the track direction. Alternatively, it is preferable that a magnetic field of a magnetic field intensity distribution having a magnetic field intensity portion equal to or greater than the magnetic coercive force Hcs of the slave medium in only one direction at the position of the track direction, and a magnetic field intensity in the opposite direction less than the magnetic coercive force Hcs of the slave medium, is produced by generating a magnetic field of a magnetic field at either position of the track direction thereof.

Further, the application of the transfer magnetic field is performed by generating a magnetic field of a magnetic field intensity distribution so that: there are no magnetic intensities exceeding the maximum value of the optimal range of the transfer magnetic field intensity present in either of the track directions; a portion having a magnetic intensity within the optimal range of the transfer magnetic field intensity is present on at least one or more places in one track direction; the magnetic field intensity in the opposite track direction is less than or equal to ½ of the magnetic coercive force Hcs of the slave medium at any track direction position across the entirety of the recording surface region of the slave medium, at a portion of the track direction; and the magnetic transfer is performed by rotating in the track direction the conjoined body formed by the magnetic transfer master medium and the slave medium which have been brought into and maintained in the close-contact state, or by rotating the magnetic field in the track direction. The optimal range of the transfer magnetic field intensity is 0.6–1.3 times the magnetic coercive force Hcs of the slave medium.

According to another magnetic transfer method of the present invention: a recording face of a slave medium that has been initially magnetized in the track direction is brought into close contact with the uneven pattern surface of a master medium that has been provided with an uneven pattern corresponding to the data to be transferred to said slave medium; and a transfer magnetic field is applied to the slave medium in the direction opposite that in which the initial magnetization current has been applied; wherein a plurality of slave mediums are prepared; said plurality of slave mediums are stacked so that the center of the track of each of said plurality of slave mediums is aligned; a direct current magnetic field is applied in the track direction of said plurality of slave mediums, which are in the stacked state, to concurrently initially magnetize said plurality of slave mediums; whereby a plurality of the slave mediums that have been initially magnetized in the track direction are formed.

Note that for cases in which the slave medium is a flexible disk, the initial magnetization thereof can be performed before or after the center core has been glued thereto. In particular, it is desirable that after the flexible disks have been formed by a punch press, the initial magnetization be performed on a plurality of slave mediums that have been stacked on a stocker. Note that in this case, it is desirable that the surface roughness of each flexible disk be Ra >1.5 nm.

According to the present invention as described above, by causing the magnetic field intensity in the direction opposite that of the track direction, in which the transfer magnetic field is applied to the portion of the slave medium to which the magnetic transfer is to be performed, to be equal to or less than ½ the magnetic coercive force Hcs of the slave medium across the entirety of the recording surface thereof, even if there is a concentration of the magnetic field by the uneven pattern in the close-contact state, there is no distortion caused to the magnetic pattern due to the effect of the leakage magnetic field, and the magnetic transfer of an exact magnetic pattern is performed uniformly across the entirety of the recording surface of the slave medium; for cases in which the data signal is a servo signal, an accurate tracking function can be ensured and the reliability improved thereby.

Further, when constructing the magnetic transfer apparatus, by regulating the intensity of the leakage magnetic field of the transfer magnetic field so that said intensity falls within the permissible range described above, because a favorable magnetic transfer can be performed, designing and planning the accuracy of the overall assembly of the apparatus, the intensity of the magnetic field generated by the magnetic field generating means, the distribution and the like becomes easier.

According to the magnetic transfer method of the present invention: because a plurality of slave mediums are pre- pared; said plurality of slave mediums are stacked so that the center of the track of each of said plurality of slave mediums is aligned; a direct current magnetic field is applied in the track direction of said plurality of slave mediums, which are in the stacked state, to concurrently initially magnetize said plurality of slave mediums; whereby a plurality of the slave mediums that have been initially magnetized in the track direction are formed; that is to say, because the initial magnetization process has been performed so that a plurality of slave mediums are formed in a single iteration of said process, it becomes possible to shorten the manufacture time of the preformatted slave mediums, as well as to simplify the apparatus therefor. Therefore, a higher quality preformatting can be realized in the magnetic transfer method of the present invention, and a reduction of costs can be aimed for.

BRIEF DESCRIPTION OF THE DRAWINGS

FIG. 2 is a plan view illustrating the regulation of the intensity of the magnetic field leaked from the transfer magnetic field, FIGS. 4A, 4B, and 4c are drawings illustrating the basic processes of the magnetic transfer method according to the present invention.

DESCRIPTION OF THE PREFERRED EMBODIMENTS

Figure 1:
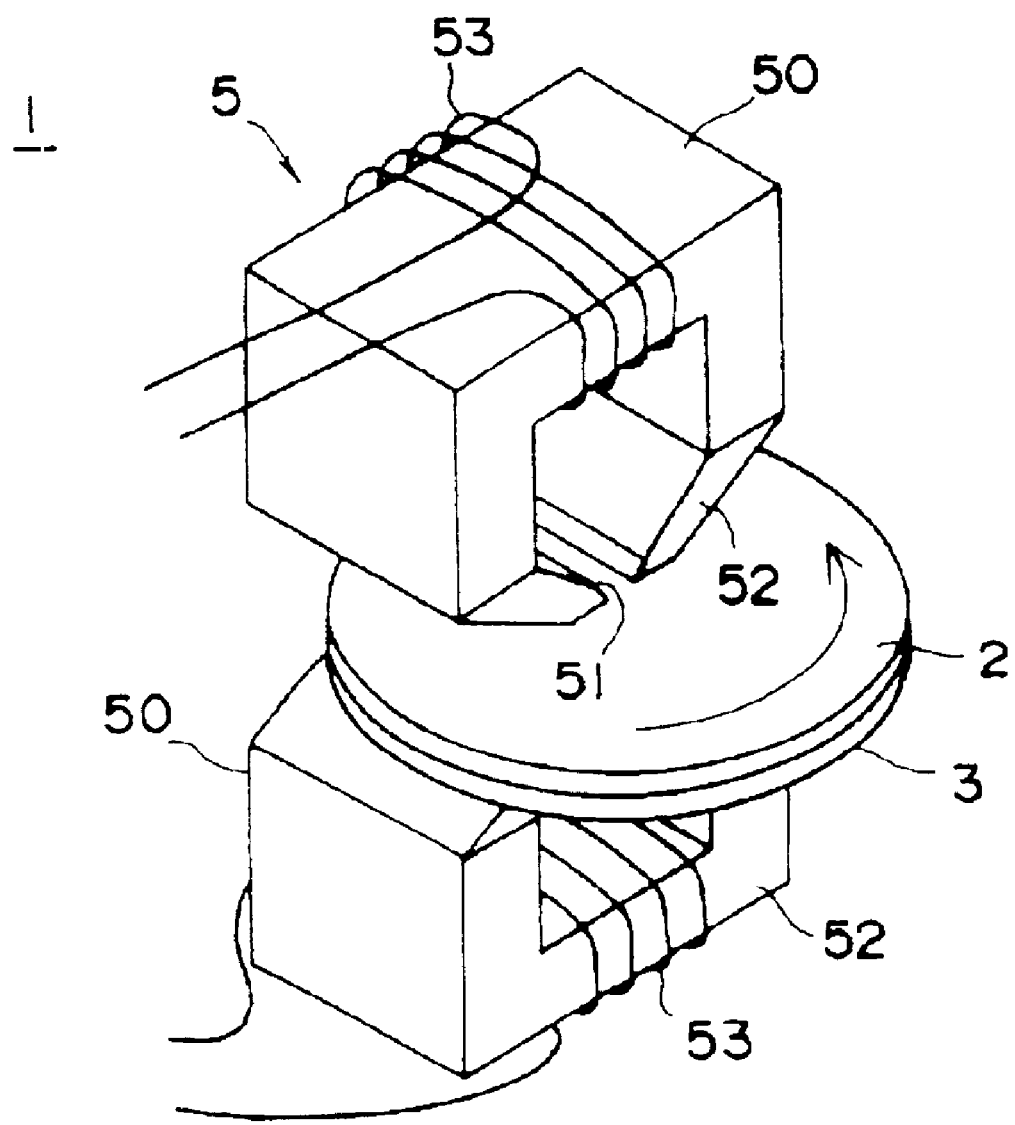
FIG. 1 is a perspective view of the main parts of a magnetic transfer apparatus implementing the magnetic transfer method according to an embodiment of the present invention.
Figure 3A:
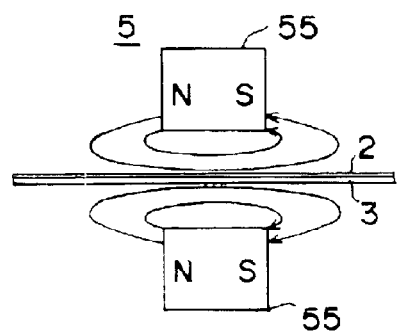
FIGS. 3A, 3B, and 3C are schematic drawings of other embodiments of the magnetic field generating means according to the present invention.
Figure 3B:
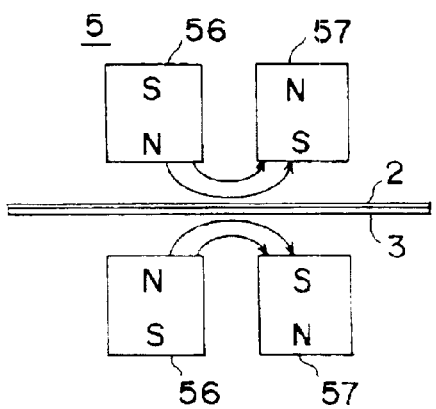
Figure 3C:
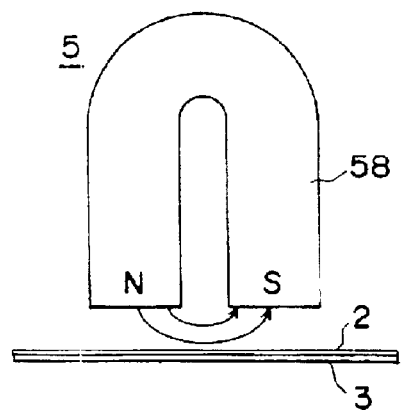

Hereinafter, the preferred embodiments of the present invention will be explained with reference to the attached drawings. FIG. 1 is a perspective view of the main parts of a magnetic transfer apparatus implementing the magnetic transfer method according to an embodiment of the present invention. Further, FIG. 2 is a plan view illustrating the regulation of the of the leakage magnetic field intensity of the transfer magnetic field, FIGS. 3A, 3B, and 3C are schematic drawings of other embodiments of the magnetic field generating means according to the present invention, and FIGS. 4A, 4B, and 4C are drawings illustrating the basic processes of the magnetic transfer method according to the present invention. Note that each drawing is a model drawing, and the actual dimensions of each part shown therein are of different proportions. According to the magnetic transfer apparatus shown in FIG. 1: when performing a magnetic transfer, after the initial magnetization described below has been performed, the slave surface (a magnetic recording surface) of a slave medium (a magnetic recording medium) 2 is brought into contact with the data bearing surface of a master medium 3, and conjoined therewith under the application thereto of a predetermined pressure to form a conjoined body. A transfer magnetic field is applied by a magnetic field generating means 5 to this conjoined body to perform the magnetic transfer of the magnetic pattern of a servo signal or the like.

The slave medium 2 is a disk shaped magnetic recording medium such as a hard disk, a flexible disk, or the like, which has been provided with a magnetic recording layer on a single surface or on both surfaces thereof. Before being brought into close contact with a master medium 3, the slave medium 2 is subjected to a cleaning process, by use of a glide head, a grinding body, or the like, to remove the microscopic protrusions or dust on the surface thereof, as necessary.

Further, the slave medium 2 is subjected to a initial magnetizing process. This initial magnetizing process entails generating a magnetic field of a magnetic field intensity distribution on a portion of the track direction so that: at least one or more places on the track direction position has a magnetic field intensity portion equal to or greater than the magnetic coercive force Hcs of the slave medium 2, and preferably a magnetic field intensity portion equal to or greater than the magnetic coercive force Hcs of the slave medium 2 in only one direction of the track position; and the magnetic field intensity in any track direction position in the opposite direction is less than or equal to the magnetic coercive force Hcs of the slave medium 2; wherein all of the tracks are initially magnetized (direct current degaussing) by rotating, in the track direction, the slave medium 2 or the magnetic field.

The master medium 3 is formed in a disk shape, and is provided with a data bearing surface, which is formed of a micro uneven pattern formed by a magnetic layer 32 (refer to FIG. 4B) on one surface of the master medium; the surface on the opposite side is supported by a conjoining means (not shown) for bringing a slave medium 2 conveyed thereto and the master medium 3 into close contact. As shown in the drawings, there are cases in which a single slave surface of the slave medium 2 is conjoined with the data bearing surface of the master medium 3 and the magnetic transfer is performed one surface at a time, and cases in which each of both of the slave surfaces of the slave medium 2 are conjoined with the data bearing surface of a master medium, respectively, and the magnetic transfer is performed on both surfaces concurrently. The master medium 3 is subjected to a cleaning process to remove debris from the data bearing surface thereof as necessary before being conjoined with the slave medium 2.

The magnetic field generating means 5 for applying the transfer magnetic field to the conjoined body is provided with two electromagnetic apparatuses 50 and 50 disposed on the upper and lower sides thereof, respectively, each of which is formed of a core 52, which has a gap 51 extending in the radial direction of the slave medium 2 and master medium 3 supported by the conjoining means, around which has been wrapped a coil 53; both the upper and lower electromagnetic apparatuses 50 apply a transfer magnetic field having magnetic lines of flux G (see FIG. 2) in the same direction, which is the direction parallel to the track direction.

When applying the magnetic field, the conjoined body formed of the slave medium 2 and the master medium 3 maintained in the close-contact state is rotated while the magnetic field generating means 5 applies the transfer magnetic field, whereby the transfer data of the master medium 3 is magnetically transferred and recorded on the slave surface of the slave medium 2. The magnetic field generating means can also be rotatably provided.

According to the transfer magnetic field: there are no magnetic intensities exceeding the maximum value of the optimal range of the transfer magnetic field intensity (0.6–1.3 times the magnetic coercive force Hcs of the slave medium 2) present in either of the track directions; and a portion having a magnetic intensity within the optimal range of the transfer magnetic field intensity is present in at least one place in one track direction. Further, the magnetic intensity in the opposite track direction is less than or equal to ½ of the magnetic coercive force Hcs of the slave medium 2 at any track direction position across the entire region of the of the recording surface of the slave medium 2.

That is to say, as shown in the plan view given in FIG. 2, a transfer magnetic field is applied in the track direction D, which runs along the direction of the magnetic lines of flux G generated in the gap 51 by the magnetic field generating means 5, on the circumferential track 21, which has been formed as a disk shaped track that is concentric with the slave medium 2. This track direction D is a circumferential direction, and if viewed as a solid line from the planar surface at the track 21 of the position on the opposite side of the center line (the lower direction in the drawing), becomes the opposite direction; at the 90 degree position (the right and left positions in the drawing), they perpendicularly intersect. Then, as to the leakage magnetic field generated at portions other than the gap 51, the component d shown by the broken line and which has a directionality in the opposite direction of the track direction D is regulated so as to be less than or equal to ½ of the magnetic coercive force Hcs of the slave medium 2, across the entire recording surface thereof. The reason for regulating the intensity of this magnetic field leaked from the transfer magnetic field to the range described above will be described below.

The magnetic field generating means 5 can also be provided on only one side of the conjoined mediums. Further, as alternative embodiments of the magnetic field generating means 5, electromagnetic apparatuses or permanent magnet apparatuses such as those shown in FIGS. 3A, 3B, and 3C can be employed, and can be provided on one or both sides of the conjoined body.

The magnetic field generating means 5 shown in FIG. 3A comprises one electromagnet (or a permanent magnet) 55, of which both side portions are parallel with the slave surface and have opposite magnetic poles respectively, extending in the radial direction of the slave medium 2, and generates a magnetic field in the track direction. The magnetic field generating means 5 shown in FIG. 3B comprises two parallel electromagnets (or permanent magnets) 56 and 57, which extend in the radial direction of the slave medium 2 at predetermined intervals, of which the end surfaces facing the slave surface are of opposite magnetic poles, and generates a magnetic field in the track direction. The magnetic field generating means 5 shown in FIG. 3C comprises a cross-sectional U shaped permanent magnet (or electromagnet) 58 extending in the radial direction, of which the two parallel end surfaces facing the slave surface are of opposite magnetic poles, and generates a magnetic field in the track direction.

According to each embodiment of the magnetic field generating means described above, the leakage magnetic field intensity leaked in the track direction opposite that in which the transfer magnetic field has been applied to the designated magnetic field application portion by the magnetic field generating means 5, is regulated so as to be less than or equal to ½ of the magnetic coercive force Hcs of the slave medium 2 across the entire region of the of the recording surface of the slave medium 2.

Next, FIGS. 4A, 4B, and 4C illustrate the basic states of the magnetic transfer: FIG. 4A shows the process wherein a magnetic field is applied in one direction to initially magnetize the slave medium 2; FIG. 4B shows the process wherein a magnetic field is applied in the opposite direction to the conjoined body formed of the master medium 3 and the slave medium 2; and FIG. 4C shows the state after the magnetic transfer has been performed.

First, as shown in FIG. 4A, an initial magnetization direct current magnetic field Hin is applied to the slave medium 2 in one direction of the track direction to initially magnetize the slave medium (initial magnetization). Then, as shown in FIG. 4B, the slave surface (magnetic recording surface) of the slave medium 2 and the data bearing layer, which is formed by a magnetic layer 32 that has been coated over the uneven pattern of the substrate 31, are brought into close contact, and the transfer magnetic field Hdu is applied to the slave medium 2 in the track direction thereof opposite that in which the initial magnetization direct current magnetic field Hin has been applied, to perform the magnetic transfer. As a result, as shown in FIG. 4c, a magnetic pattern corresponding to the pattern form of the depression spaces and protrusion portions of the magnetic layer 32 of the data bearing face of the master medium 3 is transferred to the slave face (the track) of the slave medium 2.

Note that even for cases in which the uneven pattern of the substrate 31 of the master medium 3 is a negative uneven pattern, that is, the reverse of the positive uneven pattern shown in FIG. 4B, the same magnetic pattern can be transferred and recorded by applying the initial magnetization direct current magnetic field Hin and the transfer magnetic field Hdu in the directions opposite those described above.

For cases in which the substrate 31 is a ferromagnetic body formed of Ni or the like, it is possible to perform the magnetic transfer by use of this substrate 31 only and, although it is not necessary to provide the magnetic layer 32, a more favorable magnetic transfer can be performed if a magnetic layer 32 having favorable transfer characteristics is provided. If the substrate 31 is formed of a non-magnetic body, it is necessary to provide the magnetic layer 32. It is preferable that the magnetic layer 32 of the master medium 3 be a magnetic layer having a magnetic coercive force Hcm of 48 kA/m (≈600 Oe).

A synthetic resin, a ceramic material, an alloy, aluminum, glass, quartz, silicon, nickel, or the like is used to form the substrate 31 of the master medium 3. The uneven pattern can be formed by use of a stamping method, a photo fabrication method, or the like.

According to the stamping method: a layer of photoresist is formed on the smooth, flat surface of a glass substrate (or a quartz substrate) by use of a spin coating process; a laser beam (or an electron beam), which is modulated in correspondence to a servo signal, is emitted while this glass substrate is being rotated, and a predetermined pattern, such as that of a servo signal extending linearly in the radial direction from the rotational center of each track, is exposed over the entire surface of the photoresist on the portions corresponding to each frame on the circumference. Then, the photoresist is subjected to a development process, the exposed portion of the photoresist is removed and an original disk having an uneven pattern formed by the remaining photoresist is obtained thereby. Next, the surface of the uneven pattern thus formed on the surface of the original disk is subjected to a plating process (electroforming), whereby an Ni substrate having a positive uneven pattern is formed; said Ni substrate is then peeled away from the original disk. This Ni substrate can be employed as a master plate as is, or after a pliable magnetic layer or a protective layer has been further applied over the uneven pattern thereof, as required.

Further, the aforementioned original disk can be metal plated to form a second original disk, and this second original disk used to perform a further metal plating process, whereby a substrate having a negative uneven pattern can be formed. Also, a third original disk can be formed by metal plating the second original disk or by hardening of a synthetic resin impressed onto the second original disk; this third original disk can be metal plated to obtain a substrate having a positive uneven pattern.

On the other hand, after the uneven pattern has been formed of photoresist on the glass substrate, etching can be performed to form holes in the glass substrate, whereby a substrate from which photoresist has been removed can be obtained; a substrate can be formed therefrom based on any of the methods described above.

Ni or a Ni alloy can be used as the material to form a metallic substrate, and any of various types of methods of forming a metallic layer, including electroless deposition methods, electroformation methods, sputtering methods, and ion plating methods can be employed as the plating method used to form this substrate. It is preferable that the depth (the height of the protrusions) of the uneven pattern formed on the substrate be in the range of 80–800 nm; and more preferably, in the range of 150–600 nm. For cases in which this uneven pattern is that of a servo signal, said pattern is formed long in the radial direction of thereof. For example, it is preferable that the length in the radial direction be 0.05–20 um, and 0.05–5 um in the circumferential direction; it is preferable that a pattern of this type, in which the length in the radial direction is long and within this range, is selected as the pattern for bearing servo signal data.

As to the material forming the magnetic layer 32, Co, a Co alloy (CoNi, CoNiZr, CoNbTaZr, or the like), Fe, an Fe alloy (FeCo, FeCoNi, FeNiMo, FeAlSi, FeAl, FeTaN), Ni, an Ni alloy (NiFe), or the like can be employed therefor; it is particularly preferable that FeCo, or FeCoNi be employed. This magnetic layer 32 is formed of a magnetic material and by use of a vacuum layer forming means such as a vacuum deposition method, a sputtering method, an ion plating method, or by a metal plating method, etc. It is preferable that the thickness of the magnetic layer 32 be in the range of 50–500 nm, and even more preferably, in the range of 100–400 nm.

Note that it is preferable that a DLC or other type of protective layer is formed on the magnetic layer, and a lubricating layer can also be provided. Further, it is even more preferable that the protective layer be a 5–30 nm Diamond Like Carbon (DLC) film and that a lubricating layer is also provided. Also, a contact enhancing layer formed of Si or the like can also be provided. The lubricant serves to improve the durability with respect to surface damage due to friction or the like when correcting misalignments occurring during the conjoining process.

A resin substrate can also be formed utilizing the aforementioned original disk, and a magnetic layer can be formed on the surface thereof and the resulting product used as a master disk. As to the resin material used to form the resin substrate, it is possible to use an acrylic resin such as polycarbonate or polymethylmethacrylate (PMMA), a chlorinated vinyl resin such as polychlorinated vinyl or copolymerized chlorinated vinyl, an epoxy resin, an amorphous polyolefin, a polyester, or the like. From the point of view of lubricity, dimensional stability, cost and the like, it is preferable that polycarbonate be used as said resin material. For cases in which there are burrs or the like adhered to the surface of a formed substrate, said burrs or the like is removed by use of a varnish or a polish. Further, a UV light cured resin, an electron beam cured resin or the like can be used to form a resin layer on the original disk by use of a spin coating process, a bar coating process or the like. It is preferable that the height of the protrusion portions of a resin substrate be with the range of 50–1000 nm; more preferably, in the range of 100–500 nm.

A master medium is obtained by coating a magnetic layer onto the micro uneven pattern of the surface of the resin substrate. This magnetic layer is formed of a magnetic material and by use of a vacuum layer forming means such as a vacuum deposition method, a sputtering method, an ion plating method, or by a metal plating method, etc.

Meanwhile, the photo fabrication method can be a method comprising the steps of, for example, coating the smooth, flat surface of a flat, plate shaped substrate with photoresist, and forming a data pattern corresponding to a servo signal pattern, by use of an exposure and developing process employing a photo mask. Then, the substrate is etched corresponding to the pattern by use of an etching process, thereby forming holes of a depth corresponding to the thickness of the magnetic layer. Next, a film of magnetic material of a thickness corresponding to the holes formed by the metal plating method is formed on the surface of the substrate, by use of a vacuum layer forming means such as a vacuum deposition method, a sputtering method, an ion platting method, etc. Continuing, the photoresist is removed by use of a lift off method, the surface is polished, whereby any burrs adhered thereto is removed and the surface is smoothed.

As to the slave medium 2, a disk shaped magnetic recording medium such as a hard disk, an HD flexible disk or the like can be employed thereas; wherein a magnetic recording layer thereof is formed by coating a layer of magnetic material, or by forming a thin metallic magnetic film recording layer on the surface thereof. As to the material forming the thin metallic magnetic film recording layer, Co, a Co alloy (CoPtCr, CoCr, CoPtCrTa, CrNbTa, CoCeB, CoNi or the like), Fe, or an Fe alloy (FeCo, FeP, FeCoNi), Ni, an Ni alloy (NiFe) can be employed therefor. In order to perform a clear magnetic transfer, it is preferable that these materials have a high density magnetic flux, and magnetic anisotropy in the same direction as that in which the magnetic field is applied (if recording within the surface, the direction within the surface). It is preferable, therefore, that a non-magnetic sub layer be provided so as to provide the magnetic anisotropy required beneath the magnetic material (on the substrate side thereof). A crystalline structure and a lattice coefficient must be matched to the magnetic layer; to this end, Cr, CrTi, CoCr, Crta, CrMo, NiAl, Ru or the like is employed.

Here, the results of an experiment, which has been conducted with the leakage magnetic field intensity of the transfer magnetic field within the range described above, will be explained. The master medium, the slave medium, and the magnetic transfer method used in the experiment are described below.

Manufacture of the Master Medium:

A Ni substrate having a 0.2 um deep disk shaped pattern was formed by use of an Ni stamping method; wherein, said pattern is formed of radial lines spaced at equivalent 0.5 um intervals, and the line interval is a 0.5 um interval at the position of the innermost circumference at 20 mm in the radial direction up to the position 20–40 mm in the radial direction from the center of the disk. In a vacuum film forming apparatus, under conditions wherein Argon has been introduced after depressurization at room temperature to $1.33 \times 10^{-5}$ Pa ($10^{-7}$ Torr) and the pressure is 4 Pa ($3 \times 10^{-3}$ Torr), a 200 nm thick FeCo film (pliable magnetic layer) is formed on an Ni base plate, whereby a master medium having a magnetic coercive force Hcm of 8 kA/m (100 Oe), and a magnetic flux density Ms of 28.9 T (23000 Gauss) is formed.

Manufacture of the Slave Medium:

In a vacuum film forming apparatus, under conditions wherein Argon has been introduced after depressurization at room temperature to $1.33 \times 10^{-5}$ Pa ($10^{-7}$ Torr) and the pressure is 4 Pa ($3 \times 10^{-3}$ Torr), a glass substrate is heated to 200° C., a 60 nm film of CrTi and a 25 nm film of CoCrPt are formed thereon to produce a 3.5" disk shaped magnetic recording medium (a hard disk) having a magnetic coercive force Hcs of 199 kA/m (2500 Oe) and a magnetic flux density Ms of 5.7 T (4500 Gauss).

Magnetic Transfer Test Method:

Initial magnetization was performed so that the peak magnetic field intensity at the surface of the slave medium would be 398 kA/m (5000 Oe) by positioning an electromagnet having a ring type head as shown in FIG. 1. Next, the initially magnetized slave medium and the master medium were placed in close contact, and the current supplied to the electromagnet having the ring type head was adjusted so that the peak magnetic field intensity at the surface of the slave medium would be 207 kA/m (2600 Oe).

At this time, the spatial interval between the upper and lower electromagnets was changed, and while maintaining the transfer magnetic field intensity at 207 kA/m (2600 Oe), only the leakage magnetic filed intensity was changed. The position at which the leakage magnetic field, which is in the direction opposite to that of the transfer direction, is at its highest intensity is at the inner circumferential position 180° opposite the transfer magnetic field application position while sandwiching the center. As shown in Table 1 below, by adjusting the current supplied to the electromagnets from 18 to 40 A corresponding to the change in the spatial interval between the upper and lower electromagnets to 20~40 mm, the leakage magnetic field in the opposite direction at this position was changed to 40 kA/m (500 Oe), 64 kA/m (800 Oe), 96 kA/m (1200 Oe), and 119 kA/m (1500 Oe), and magnetic transfer was performed. Note that the close contact between the master and slave mediums was achieved by pressurizing aluminum plates with a rubber plate sandwiched therebetween.

Electromagnetic Conversion Characteristics Evaluation Method:

An evaluation of the transfer signal of the slave medium was performed by use of a electromagnetic conversion characteristics measuring apparatus (Kyodo Electronics SS-60) As to the head, an MR head having a playback head gap of 0.24 um, a playback track width of 1.9 um, a recording head gap of 0.4 um, and a recording track width of 2.4 um, was used. A frequency analysis of the read in signal was performed by use of a spectrum analyzer, and the peak intensity C of a primary signal and the difference (C/N)

between that and externally inserted medium noise N were measured. The leakage magnetic field intensity was given a value of 0 dB at 40 kA/m (500 Oe), and evaluated at the relative value (ΔC/N). Because the signal intensity becomes smaller and in a state having transfer deficiencies if this relative value (ΔC/N) becomes smaller than −6 dB (larger in the negative direction), this value was evaluated as the permissible value. The results are shown in Table 1.

TABLE 1

| Spatial interval between upper and lower electro-magnets (mm) | Current supplied to electro-magnets (A) | Transfer magnetic field intensity (kA/m) | Leakage magnetic field intensity (kA/m) | ΔC/N (dB) |
|---|---|---|---|---|
| Example 1 | 20 | 18 | 207 | 40 | 0 (good) |
| Example 2 | 25 | 21 | 207 | 64 | −0.8 (good) |
| Example 3 | 30 | 27 | 207 | 96 | −1.5 (good) |
| Comparative example 1 | 40 | 40 | 207 | 119 | −6.1 (not good) |

As can be seen in Table 1, the Comparative example, which has an interval of 40 mm, has a leakage magnetic field intensity of 119 kA/m (1500 Oe) and an magnetic coercive force Hcs of 100 kA/m (1259 Oe), which is larger than ½ the magnetic coercive force Hcs of 199 kA/m (2500 Oe) of the slave medium, and exhibits transfer deficiencies. In contrast, according to the Examples 1–3, the leakage magnetic field intensity thereof is smaller than that of the Comparative example, and the transfer performed by the Examples 1–3 is favorable. As a result, it is confirmed that the leakage magnetic field intensity in the direction opposite that of the transfer magnetic field intensity is required to be less than or equal to ½ of the magnetic coercive force Hcs of the slave medium.

Figure 5:
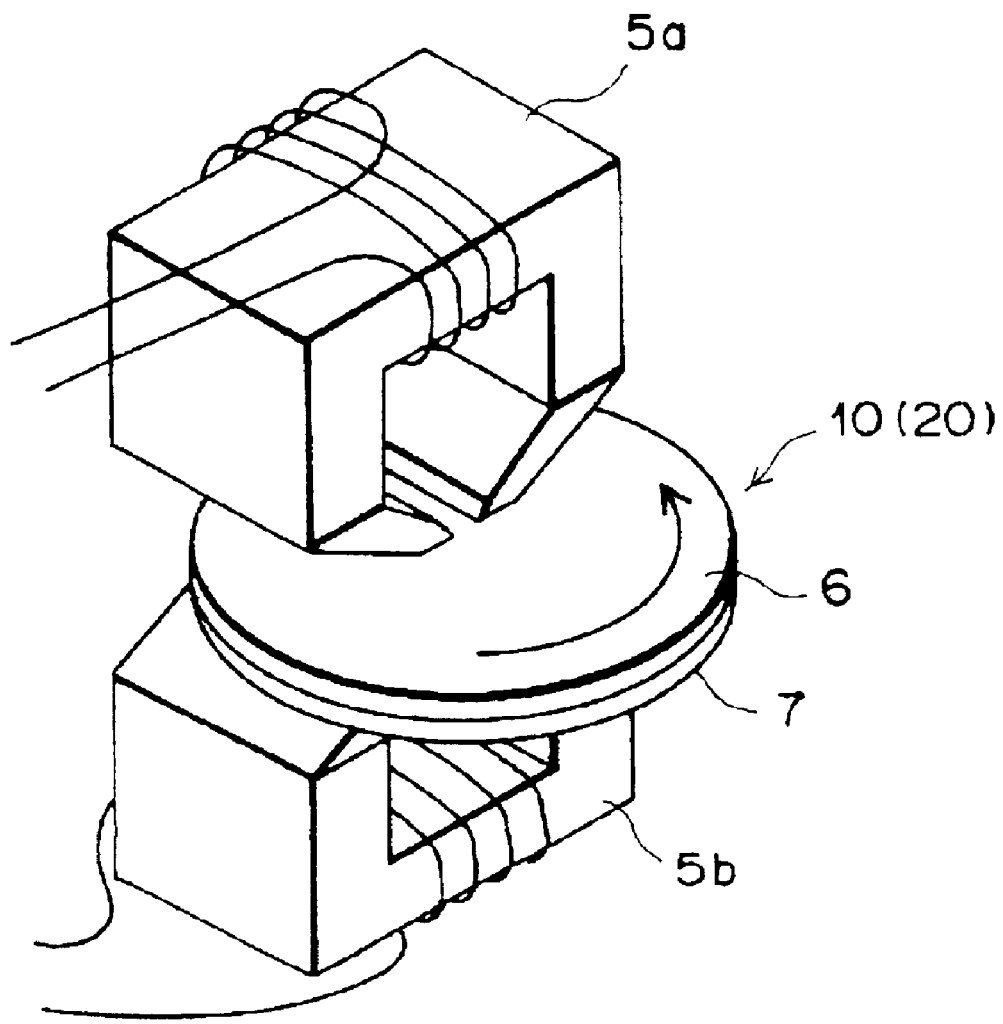
FIG. 5 is a perspective view of the main part of an embodiment of magnetic field generating means utilized in implementing the magnetic transfer method according to another embodiment of the present invention.
Figure 6:
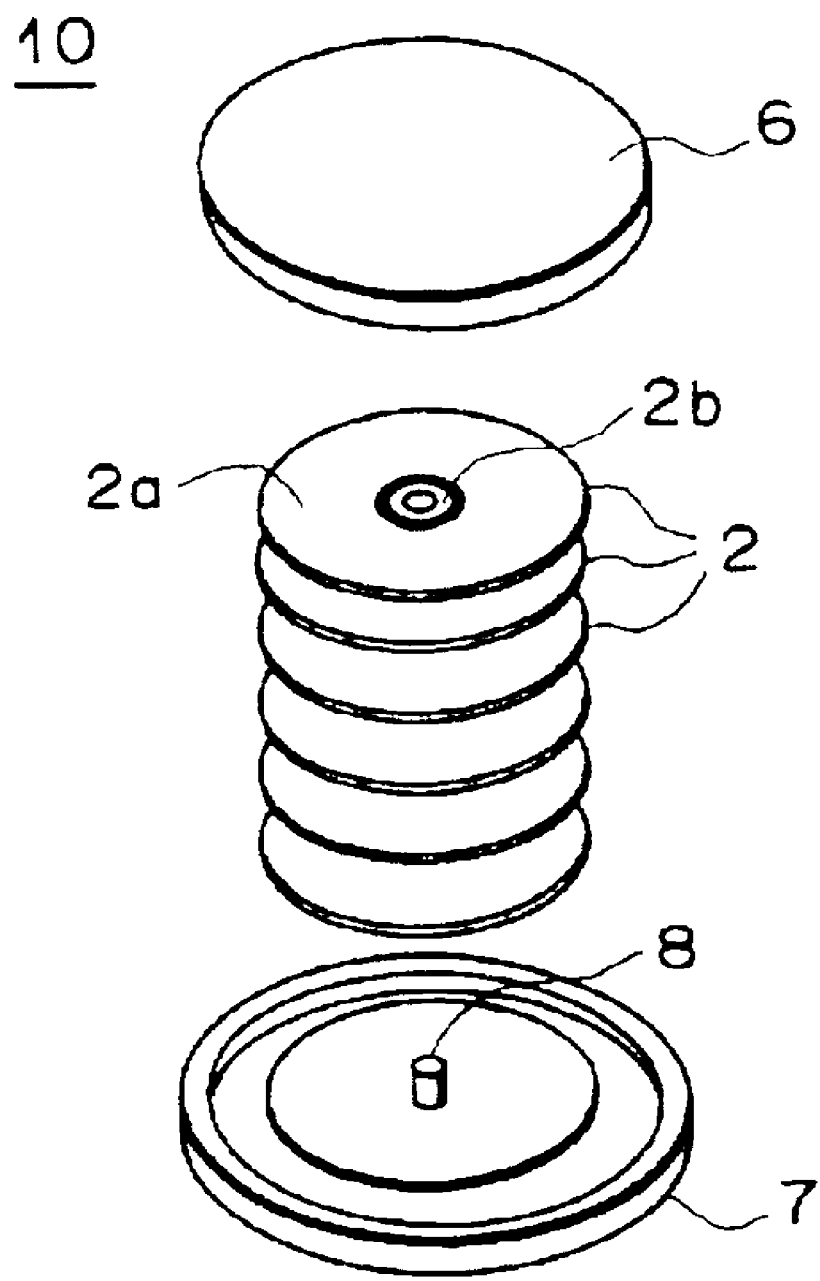
FIG. 6 is an exploded view of a slave medium fixing apparatus.
Figure 7:
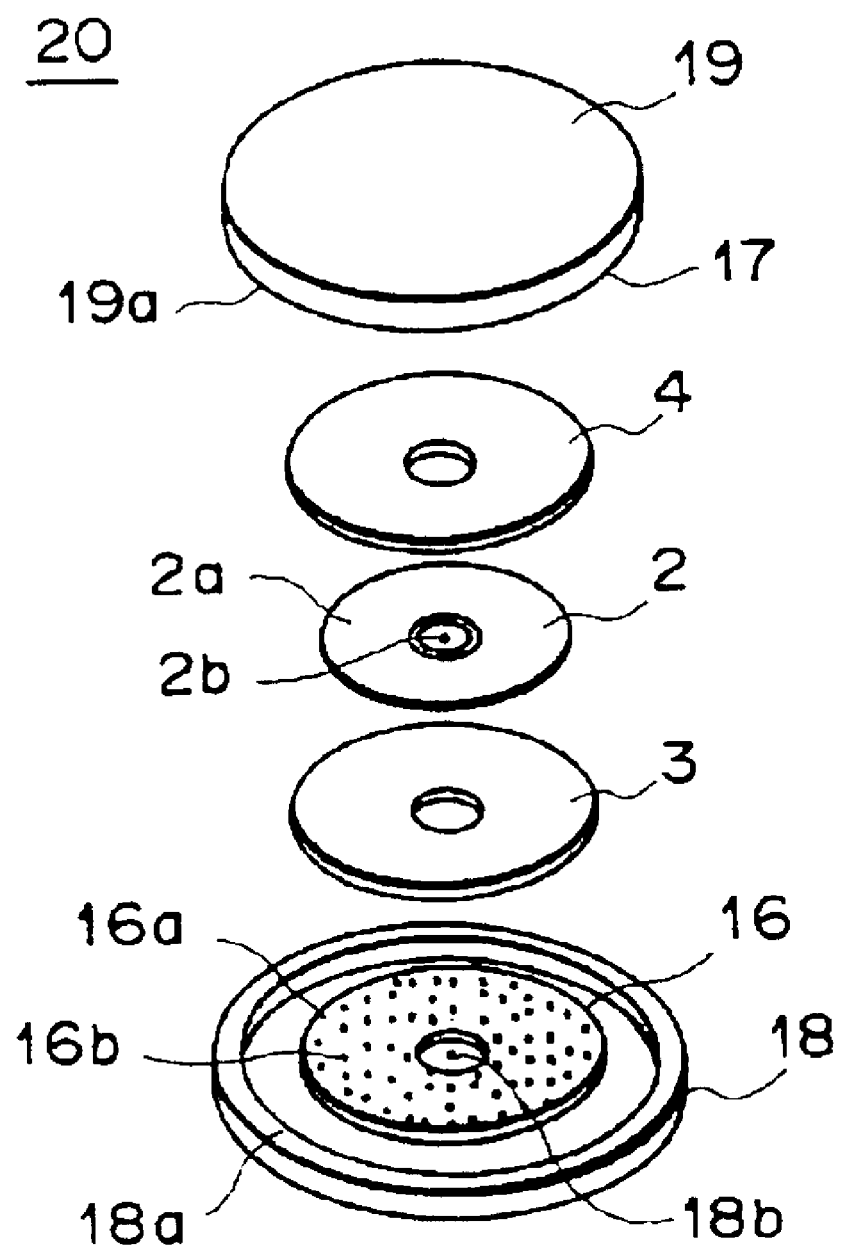
FIG. 7 is an exploded perspective view of a double sided transfer conjoined body close contact apparatus.
Figure 8:
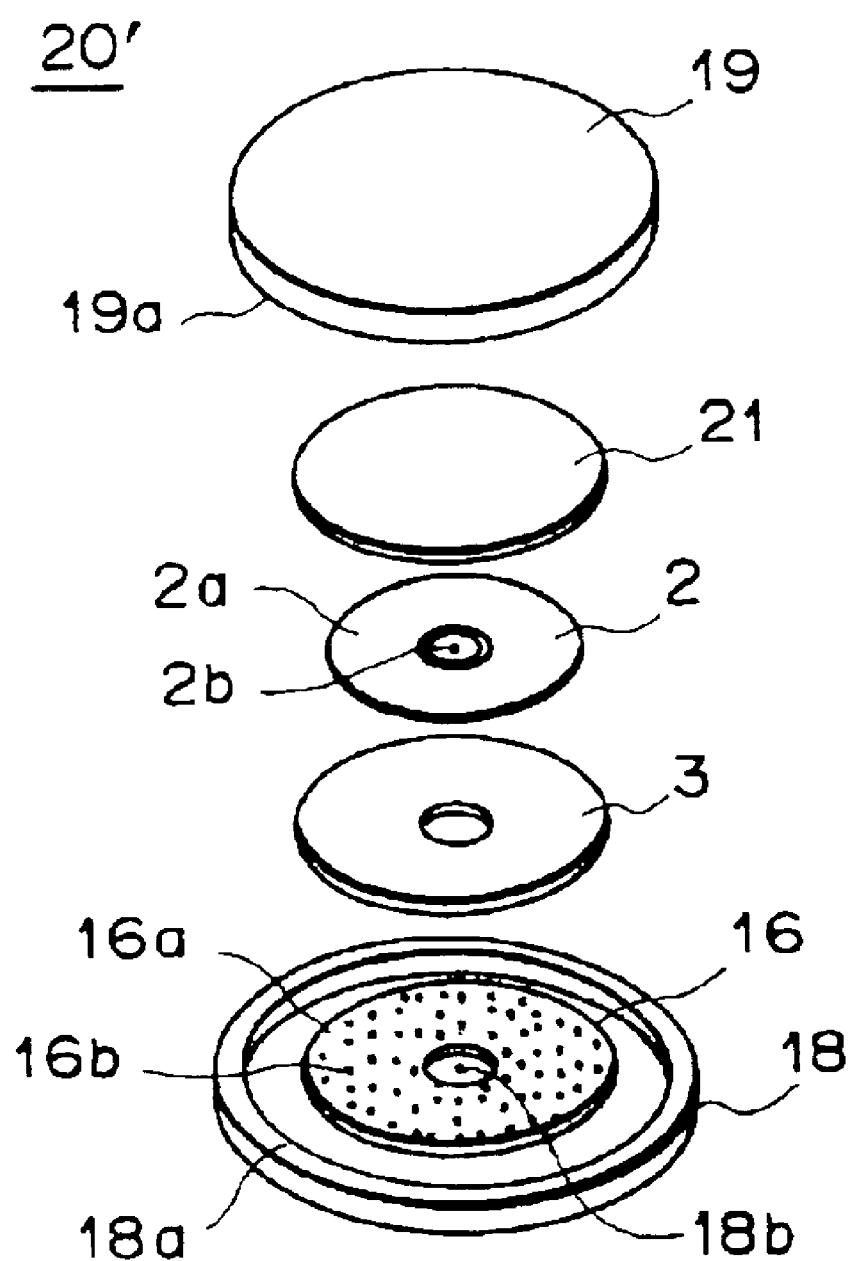
FIG. 8 is a drawing of an exploded perspective view of a single sided transfer conjoined body close contact apparatus.

Next, the initial magnetization direct current magnetic field and the application of the transfer magnetic field according to the magnetic transfer method associated with another embodiment of the present invention will be explained. FIG. 5 is a schematic perspective view of the main parts of the electromagnetic apparatuses 5a and 5b, which are magnetic field generating means for generating the initial magnetization direct current magnetic field and transfer magnetic field. FIG. 6 is an exploded view of a fixing apparatus 10 (hereinafter referred to as a slave fixing apparatus 10) that fixes a plurality of slave mediums in place so that a initial magnetization direct current magnetic field can be applied thereto. FIGS. 7 and 8 are exploded perspective views of a master medium and slave medium conjoining apparatus 20 (20') for bringing into and maintaining in close contact a master medium and a slave medium to which a transfer magnetic field is to be applied.

As shown in FIG. 5, the slave fixing apparatus 10 and the conjoining apparatus 20 (20') are disposed between the electromagnetic apparatuses 5a and 5b, and a magnetic field is applied thereto while each rotate about the axis at the center thereof.

As shown in FIG. 6, the slave fixing apparatus 10 is configured so that the upper and lower portions 6 and 7, respectively, are separable, and a plurality of slave mediums 2 are held within the interior portion thereof. The slave mediums 2 are flexible disks, which are disk shaped recording mediums 2a having fixed at the center portion thereof a hub 2b (center core), wherein the recording medium 2a comprises a disk shaped base formed of a flexible polyester sheet or the like, which has formed on both faces thereof a recording surface formed of a magnetic layer (note that for the sake of simplicity, the magnetic layer of a single surface of a slave medium is shown in FIG. 1).

A pin 8 that couples with the center hole of the hub 2b of the slave medium 2 to determine its position is formed on the center portion of the lower portion 7 of the slave fixing apparatus 10. The centers of a plurality of slave mediums 2, that is, the center of the track thereof are aligned by this pin 8, and said plurality of slave mediums 2 is stacked. In this state, wherein a plurality of slave mediums 2 have been stacked, the upper and lower portions 6 and 7 of the slave fixing apparatus 10 are closed to form an integral body; this slave fixing apparatus and the slave mediums supported therein are rotated as an integral body, taking the center of the track of the slave medium 2 as an axis.

The electromagnetic apparatuses 5a and 5b are disposed adjacent to the upper and lower surfaces of the slave fixing apparatus 10, and the initial magnetization direct current magnetic field Hin is applied by the magnetic field generating means 5, while the slave fixing apparatus 10 is being rotated, to initially magnetize the plurality of slave mediums 2 in one direction of the track direction thereof. If a plurality of slave mediums 2 are initially magnetized in this way, improvements with respect to time and equipment efficiency can be achieved, in comparison to the case in which the slave mediums 2 are initially magnetized individually one at a time.

Note that the intensity of a favorable initial magnetization direct current magnetic field should be greater than or equal to the magnetic coercive force Hcs of the slave medium, and more preferably, greater than or equal to 1.2 times the magnetic coercive force Hcs of the slave medium.

Then, each initially magnetized slave medium 2 is brought into close contact with the master medium 3 by the conjoining apparatus, and while being rotated with the conjoining apparatus 20, the transfer magnetic field is applied thereto to magnetically transfer and record the data borne on the uneven pattern of the master medium onto the slave medium 2. Note that the transfer magnetic field is applied in the direction opposite that in which the initial magnetization direct current magnetic field has been applied, and preferably, the magnitude of the magnetic transfer field intensity is 0.6–1.3 times the coercive force Hcs of the slave medium 2; more preferably, 0.8–1.2 times, and even more preferably, 1–1.1 times Hcs.

FIG. 7 is a drawing of a conjoining means 20 for use in cases wherein the magnetic transfer is to be performed on both recording surfaces of the slave medium 2 simultaneously. This conjoining means 20 comprises: a lower master medium 3 for transferring the data, such as a servo signal or the like, corresponding to the uneven pattern of the data bearing surface thereof to the lower recording surface of the slave medium 2; an upper master medium 4 for transferring the data, such as a servo signal or the like, corresponding to the uneven pattern of the data bearing surface thereof to the upper recording surface of the slave medium 2; a lower pressure conjoining member 18 provided with a lower leveling element 16 for adsorbing the lower-face master medium 3 and correcting the flatness thereof; an upper pressure conjoining member 19 provided with an upper leveling element 17 (of the same configuration as the lower leveling element 16) for adsorbing the upper master medium 4 and correcting the flatness thereof; wherein, pressure is applied to these while in the state in which the respective center portions thereof have been aligned, and the lower master medium 3 and the upper master medium 4 are brought into close contact with the respective upper and lower recording surfaces of the slave medium 2.

The lower master medium 3 and the upper master medium 4 are formed of a hard material in a ring shaped disk, and are provided on one face thereof with a transfer data bearing surface on which has been formed a micro uneven pattern that is brought into close contact with a recording surface of the slave medium 2, and the face of the lower master medium 3 and the upper master medium 4 opposite that on which the micro uneven pattern has been formed are vacuum adsorbed by the lower leveling element 16 and the upper leveling element 17, respectively. When necessary, in order to improve the contact characteristics between the slave medium 2 and the lower master medium 3 and the upper master medium 4, micro pores are provided at positions other than those on which the micro uneven pattern has been formed and on positions not connecting with the suction pores (described below) of the lower leveling element 16 and the upper leveling element 17 so as to pass through the front and back surfaces thereof; the air between the close contact surfaces of the slave medium 2 and the surface of the respective master medium is suctioned out and expelled.

The lower leveling element 16 (of the same configuration as the upper leveling element 17) is provided in the form of a disk corresponding to the size of the master medium 3, and a suction contact face 16a finished so as to have an average surface roughness of Ra 0.01–0.1 um at the center line thereof is provided on the surface thereof. This suction contact face 16a is provided with approximately 25–100 suction pores 16b having a diameter of 2 mm or less, and which are substantially uniformly distributed thereon. Although not shown in the drawing, these suction pores 16b are connected to a vacuum pump via a suction channel that extends from the interior portion of the lower leveling element 16 to the exterior portion of the lower pressure conjoining member 18, which provides the suction power thereof; the suction pores 16b attach, under the force of a vacuum suction, to the rear face of the master medium 3 that has been brought into close contact with the suction contact face 16a, and corrects the flatness of said master medium 3 so that said flatness parallels that of the suction contact face 16a.

The lower pressure conjoining member 18 and the upper pressure conjoining member 19 are each provided in the form of a disk that is movable in one or both of the axial directions thereof, and are opened and closed by an opening and closing mechanism (e.g., a pressing mechanism, a fastening mechanism) which is not shown in the drawing; the lower pressure conjoining member 18 and the upper pressure conjoining member 19 are conjoined under a mutual, predetermined pressure of the opening and closing mechanism. On the outer circumference of the lower pressure conjoining member 18 and the upper pressure conjoining member 19 are provided brim portions 18a and 19a, respectively; said brim portions 18a and 19a are brought into contact with each other when the closing operation is performed so as to maintain the inner portion in a tightly closed state A pin 18b is formed on the center portion of the lower pressure conjoining member 18, which couples with the center aperture of the hub 2b of the slave medium 2 so as to align the position thereof. Further, the lower pressure conjoining member 18 and the upper pressure conjoining member 19 are connected by a rotating mechanism (not shown) and are rotated thereby as an integral unit.

Because the magnetic transfer operation is to be performed sequentially and on both recording surfaces of a plurality of slave mediums using a single pair of a lower master medium 3 and an upper master medium 4, with regard to the conjoining apparatus 20: the center positions of the lower master medium 3 and the upper master medium 4 are aligned to those of the respective suction contact faces 16a of the lower leveling element 16 and the upper leveling element 17 and adsorbed thereby, respectively, by vacuum suction, and maintained in said adsorbed state. While the lower pressure conjoining member 18 and the upper pressure conjoining member 19 have been separated and are in the open state, the center position of the slave medium 2 is aligned and said slave medium 2 is set; then, the lower pressure conjoining member 18 and the upper pressure conjoining member 19 are brought together and closed, whereby the master mediums 3 and 4 are brought into close contact with the respective recording surfaces of the slave medium 2. Then, by the movement of the upper and lower electromagnetic apparatuses 5 or the movement of the conjoining apparatus 20, the upper and lower faces of the conjoining apparatus 20 approach the respective upper and lower electromagnetic apparatuses 5; while said conjoining apparatus 20 is being rotated, the transfer magnetic field is applied and the transfer data of the lower master medium 3 and the upper master medium 4 is transferred to the respective recording surface of the slave medium 2.

FIG. 8 is a drawing of a conjoining means 20' for use in cases wherein the magnetic transfer is to be performed on a single recording surface of the slave medium 2. This conjoining means 20' comprises: a lower master medium 3 for transferring the data, such as a servo signal or the like, corresponding to the uneven pattern of the data bearing surface thereof to the lower recording surface of the slave medium 2; a lower pressure conjoining member 18 provided with a lower-face leveling element 16 for adsorbing the lower master medium 3 and correcting the flatness thereof; and an upper pressure conjoining member 19 that supports an elastic body 21 (a cushion member); wherein, pressure is applied to these while in the state in which the respective center portions thereof have been aligned, and the lower master medium 3 is brought into close contact with a single recording surface of the slave medium 2, while the opposite side is brought into close contact with the elastic body 21. That is to say, the upper master medium 4 occurring in the embodiment described above has been exchanged for the elastic body 21, and except for the point that the upper leveling element 17 is not provided, the configuration is the same as that of said embodiment described above.

The elastic body 21 is formed in a disk shape from a material having elasticity, and is supported by the upper pressure conjoining member 19. The material of which the elastic body 21 is formed is characterized in that when the conjoining pressure is applied, the surface contour thereof changes to conform to that of the slave medium 2, and when the slave medium 2 is peeled from the master medium 3, the surface contour thereof recovers to the pre-pressure applied state thereof. More specifically, as to the material forming the elastic body 21, a silicon rubber, a polyurethane rubber, a fluorine rubber, a butadiene rubber, a Teflon rubber, baiton rubber, or other common rubber, or a foam resin such as a sponge rubber can be employed therefor. The form of the surface of the elastic body 21 that is brought into contact with the slave medium 2 is a smooth flat form parallel to that of the master medium 3, or provided protrusively towards the slave medium 2.

Here, because the magnetic transfer operation is to be performed sequentially and on a single recording surface of a plurality of slave mediums using a single lower-face master medium 3, according to the conjoining apparatus 20': the center position of the lower master medium 3 is aligned with that of the suction contact face 16a of the lower leveling element 16 and conjoined by vacuum suction thereto, and maintained in said conjoined state. Then, while the lower pressure conjoining member 18 and the upper pressure conjoining member 19 have been separated and are in the open state, the center position of the slave medium 2 is aligned and said slave medium 2 is set; next, the lower pressure conjoining member 18 and the upper pressure conjoining member 19 are brought together and closed, whereby a single surface of the slave medium 2 is brought into close contact with the master mediums 3 by the elastic force of the elastic body 21. Then, in the same manner as described above, the upper and lower faces of the conjoining apparatus 20' are brought together with the respective upper and lower electromagnetic apparatuses 5; while said conjoining apparatus 20' is being rotated, the transfer magnetic field is applied and the transfer data of the lower master medium 3 is transferred to a single recording surface of the slave medium 2. Then, the magnetic transfer is performed for the opposite recording surface of the slave medium 2 by a separate process wherein an upper master medium 4 is brought into close contact with said opposite recording face of the slave medium 2.

Figure 9:
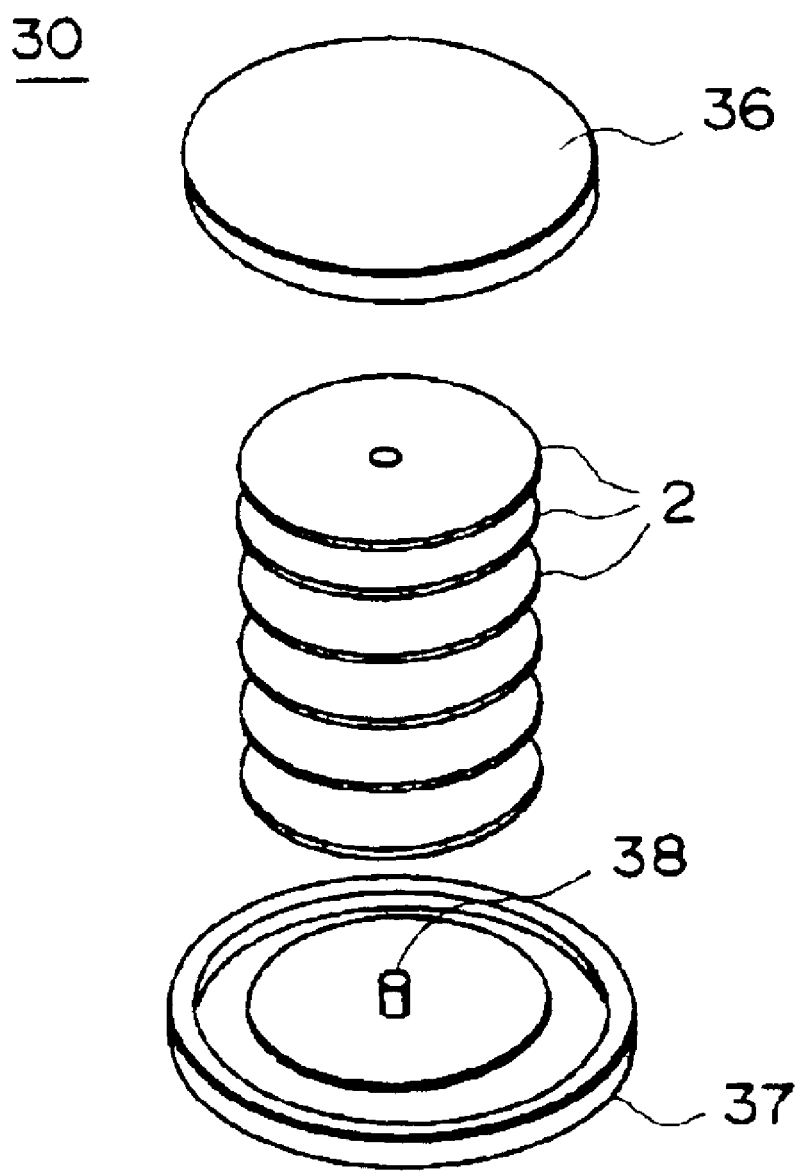
FIG. 9 is an exploded perspective view of a slave medium stocker.

Note that according to the embodiment described above, although a plurality of flexible disk slave mediums 2 have been stacked, in the state wherein each of said flexible disks has been provided with a center core 2b, as shown in FIG. 6, and initially magnetized, as shown in FIG. 9, after the flexible disks have been formed on a punch press, a plurality, consisting of, for example, approximately 100 disks of a 60 um thickness, of flexible disks can be stacked on a stocker 37, and can be initially magnetized in this stacked state, before the center core is glued to each said disk. A pin 38 that couples with the center hole of the slave medium 2 for stacking and stocking a plurality of slave mediums 2 is provided at the center portion of the stocker 37. When performing the initial magnetization process, a lid 36 is fitted to this stocker 37 to form an integral body, which is then set in the electromagnetic apparatus 5 in the same manner as occurred with the slave fixing apparatus 10 described above. The initial magnetization direct current magnetic field is applied by the electromagnetic apparatus 5, and taking the center of the track (the pin 38) as the axis, said integral body is rotated thereabout to perform the initial magnetization. Because the process according to conventional methods has consisted of stacking the punch pressed flexible disks onto the stocker 37 and then conveying said stocker 37 to the next processing station, if the flexible disks are initially magnetized on each stocker, the process can be simplified. Further, because there is no center core, more flexible disks can be stacked on each stocker, increasing efficiency. Meanwhile, because peeling apart the stacked disks becomes difficult if there is no center core, the surface thereof is provided with a surface roughness of RA>1.5 nm.

Note that according to the above description, although the slave medium 2 has been explained taking the case of the flexible disk as an example, the slave medium 2 is not limited thereto; the slave medium 2 can be a disk utilized in a hard disk apparatus (a hard disk).

What is claimed is:

1. A magnetic transfer method comprising the steps of, bringing into close contact a magnetic transfer master medium, which is formed of a substrate and a magnetic layer formed on the portion thereof corresponding to the data signal of the surface of the substrate, and a magnetic recording medium, which is a transfer receiving slave medium, and applying a transfer magnetic field to the conjoined body formed by the master medium and the slave medium maintained in the close-contact state, wherein, a magnetic field is applied to the slave surface in the track direction to initially magnetize the slave medium in the track direction, then, the master medium and the initially magnetized slave medium are brought into close contact, forming a conjoined body, a transfer magnetic field is applied to the slave surface in the track direction, and the magnetic field intensity of the magnetic field in the direction opposite that of the transfer magnetic field applied in the track direction and across the entirety of the recording surface region of the slave medium is less than or equal to ½ of the magnetic coercive force Hcs of the slave medium, when the magnetic transfer is performed.

2. A magnetic transfer method as defined in claim 1, wherein the magnetic coercive force Hcm of the magnetic layer of the transfer master medium is less than or equal to 48 kA/m (≈600 Oe).

3. A magnetic transfer method as defined in claim 1, wherein the slave medium is a disk shaped magnetic recording medium.

4. A magnetic transfer method as defined in claim 1, wherein the initial magnetization direction and the direction in which the transfer magnetic field are applied are substantially opposite to each other.

5. A magnetic transfer method as defined in claim 1, wherein the data signal is a servo signal.

6. A magnetic transfer apparatus that brings into close contact a magnetic transfer master medium, which is formed of a substrate and a magnetic layer formed on the portion thereof corresponding to the data signal of the surface of the substrate, and a magnetic recording medium, which is a transfer receiving slave medium, and applies to the conjoined body formed thereby a transfer magnetic field to perform a magnetic transfer, comprising a magnetic field generating means that applies a transfer magnetic field to the conjoined body in the track direction, wherein the magnetic field intensity of the magnetic field in the direction opposite that of the transfer magnetic field applied in the track direction and across the entirety of the recording surface region of the slave medium is less than or equal to ½ of the magnetic coercive force Hcs of the slave medium.

7. A magnetic transfer apparatus as defined in claim 6, wherein, the magnetic field generating means is an electromagnetic apparatus or a permanent magnetic apparatus.

8. A magnetic transfer apparatus as defined in claim 6, wherein, the magnetic coercive force Hcs of the magnetic layer of the transfer master medium is less than or equal to 48 kA/m (≈600 Oe).

9. A magnetic transfer apparatus as defined in claim 6, wherein, the slave medium is a disk shaped magnetic recording medium.

10. A magnetic transfer apparatus as defined in claim 9, wherein, the magnetic field generating means is a means that generates a magnetic field in the direction parallel to the track direction within the range extending in the radial direction of the slave medium, and the magnetic transfer is performed on the entire surface of the slave medium by relatively rotating the conjoined body formed by the master medium and the slave medium brought into and maintained in close contact and the magnetic field generating means.

11. A magnetic transfer apparatus as defined in claim 6, further comprising, an initial magnetizing means that initially magnetizes the slave medium in the track direction thereof.

12. A magnetic transfer method comprising the steps of, bringing a recording face of a slave medium that has been initially magnetized in the track direction thereof into close contact with the uneven pattern surface of a master medium that has been provided with an uneven pattern corresponding to the data to be transferred to said slave medium, and applying a transfer magnetic field to the slave medium in the direction opposite that in which the initial magnetization current has been applied, wherein a plurality of slave mediums are prepared, said plurality of slave mediums are stacked so that the center of the track of each of said plurality of slave mediums is aligned, a direct current magnetic field is applied in the track direction of said plurality of slave mediums, which are in the stacked state, to concurrently initially magnetize said plurality of slave mediums, whereby a plurality of the slave mediums that have been initially magnetized in the track direction are formed.

* * * * *